United States Patent
Kito

(10) Patent No.: US 7,633,077 B2
(45) Date of Patent: Dec. 15, 2009

(54) APPARATUS AND METHOD FOR CAPTURING A RADIATION IMAGE

(75) Inventor: Eiichi Kito, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/042,853

(22) Filed: Mar. 5, 2008

(65) Prior Publication Data

US 2008/0237478 A1  Oct. 2, 2008

(30) Foreign Application Priority Data

Mar. 30, 2007 (JP) ............................. 2007-093880

(51) Int. Cl.
G01N 23/04 (2006.01)
(52) U.S. Cl. .................................... 250/580
(58) Field of Classification Search ................. 250/580; 378/98.7, 108, 95; 600/407
See application file for complete search history.

(56) References Cited

U.S. PATENT DOCUMENTS

| 6,084,939 | A * | 7/2000 | Tamura ..................... 378/98.2 |
| 6,354,737 | B1 * | 3/2002 | Hufe et al. .................. 378/205 |
| 6,512,233 | B1 | 1/2003 | Sato et al. |
| 2005/0024621 | A1 * | 2/2005 | Korenaga .................... 355/72 |
| 2005/0227154 | A1 * | 10/2005 | Motoki ........................ 430/22 |
| 2006/0116566 | A1 * | 6/2006 | Bruijns ....................... 600/407 |
| 2006/0116902 | A1 * | 6/2006 | Amador et al. ................ 705/2 |

FOREIGN PATENT DOCUMENTS

| JP | 2000-197623 A | 7/2000 |
| JP | 2001-242255 A | 9/2001 |
| JP | 2001-243448 A | 9/2001 |
| JP | 2001-305224 A | 10/2001 |
| JP | 2002-082172 A | 3/2002 |
| JP | 2002-214729 A | 7/2002 |
| JP | 2003-014848 A | 1/2003 |
| JP | 2004-073586 A | 3/2004 |

* cited by examiner

*Primary Examiner*—David P Porta
*Assistant Examiner*—Kiho Kim
(74) *Attorney, Agent, or Firm*—Sughrue Mion, PLLC

(57) ABSTRACT

A direction determination processor outputs imaging direction information representing the direction of an electronic cassette with respect to a subject during imaging of the subject. An image direction judging unit generates image direction information representing the direction of image data with respect to a reading direction in which a radiation detector is read, based on the imaging direction information, or based on the imaging direction information, imaging order information and a template. An image displaying direction determining unit generates displaying direction information, which represents a displaying direction of the image data on a display screen or a display device.

11 Claims, 8 Drawing Sheets

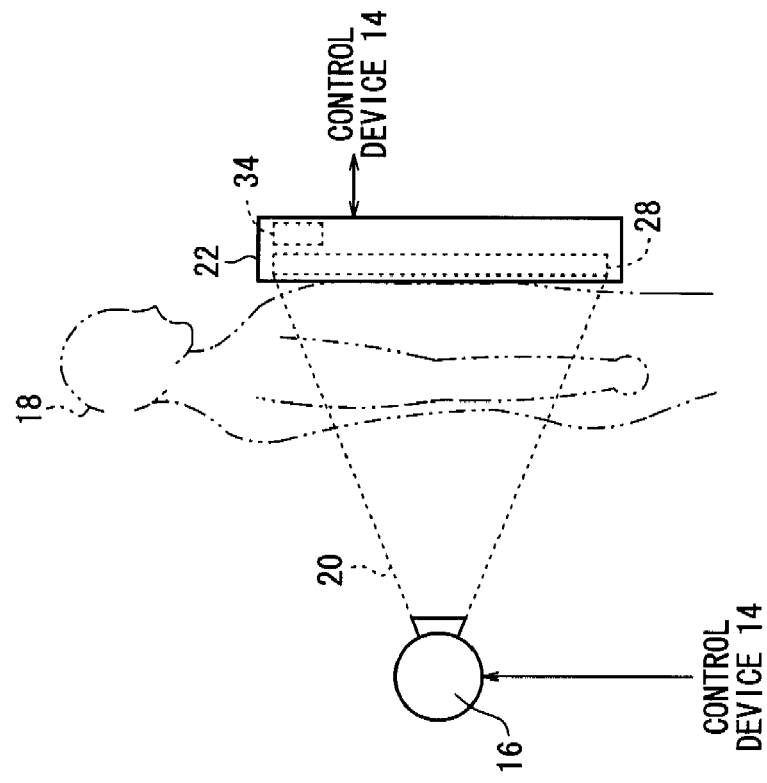
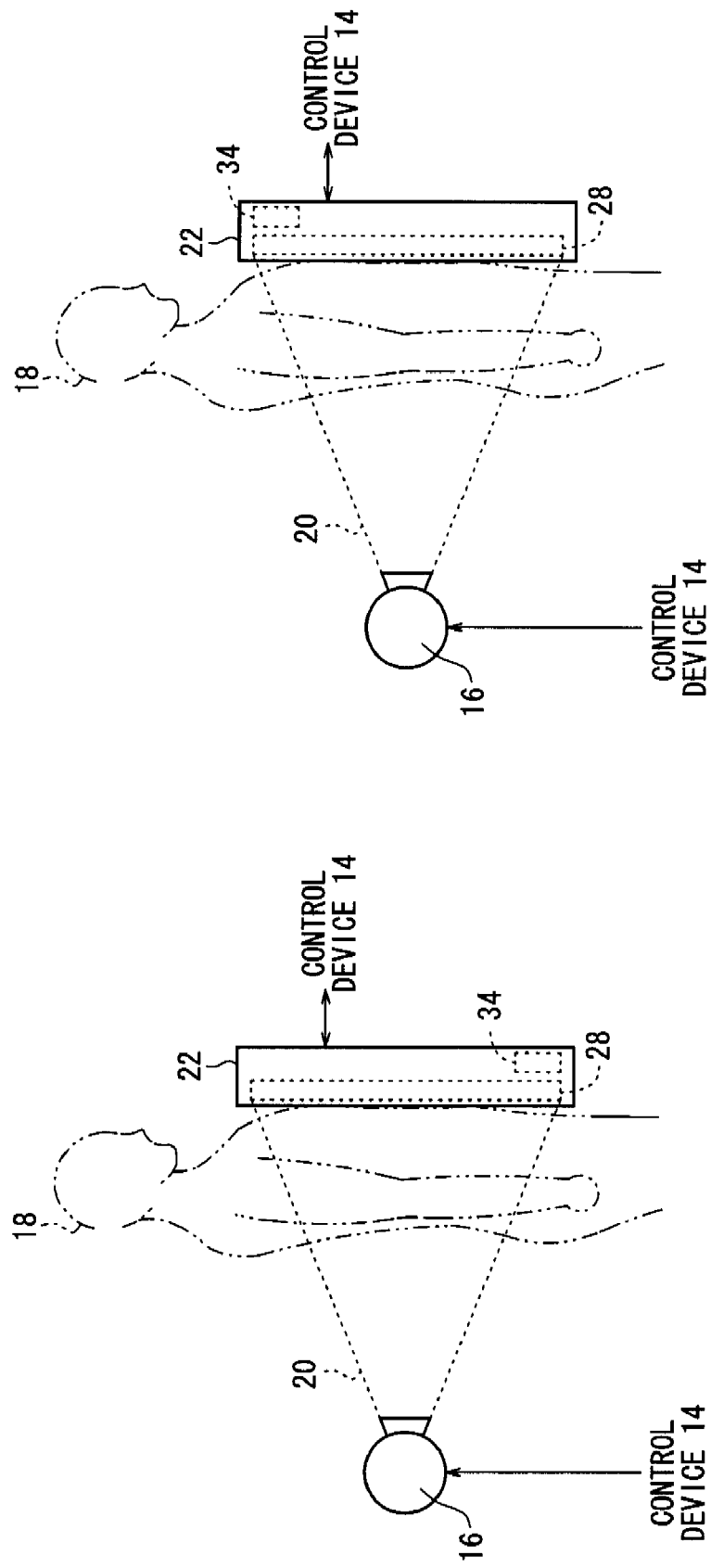

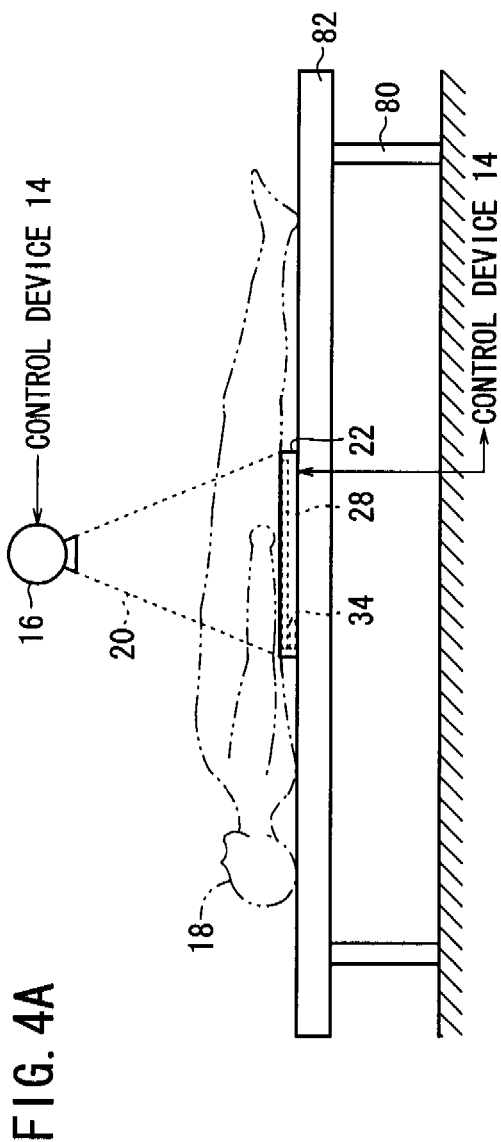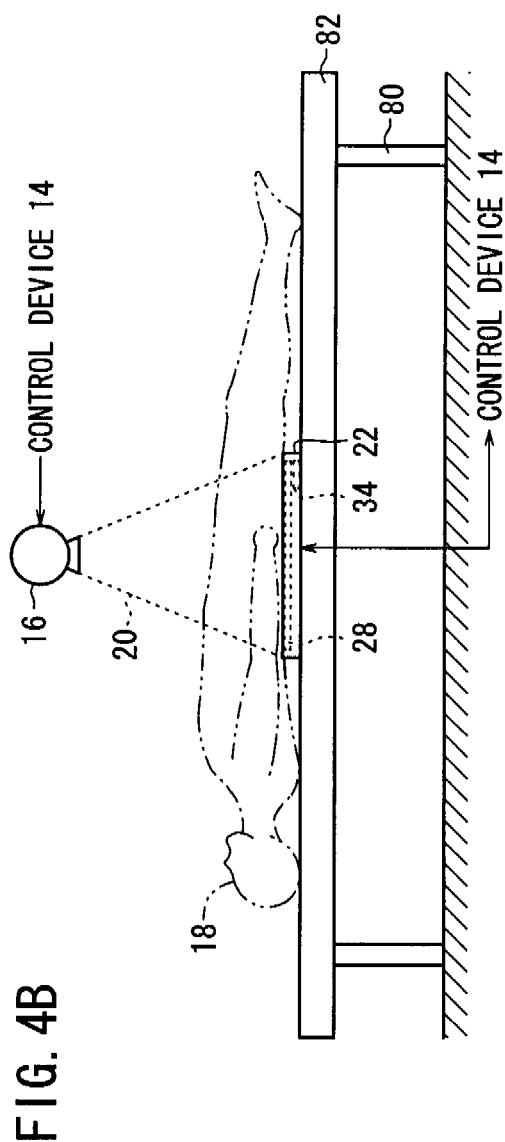

APPARATUS AND METHOD FOR CAPTURING A RADIATION IMAGE

BACKGROUND OF THE INVENTION

1. Field of the Invention

The present invention relates to an apparatus and method for capturing a radiation image of a subject, by applying radiation from a radiation source through the subject to a radiation image recording medium.

2. Description of the Related Art

Heretofore, radiation image capturing apparatus have widely been used for applying radiation to a subject, and guiding the radiation that has passed through the subject to a radiation image recording medium, for thereby recording a radiation image of the subject on the radiation image recording medium. The radiation image recording medium comprises, for example, a stimulable phosphor panel, which is capable of storing radiation energy representing radiation image information in a phosphor, and subsequently emitting the stored radiation energy as stimulated light from the phosphor by applying stimulating light to the phosphor.

In recent years, the medical field has faced demands for a system for recording radiation image information on a radiation image recording medium, and thereafter immediately reading the recorded radiation image information for diagnosis or the like. To meet such demands, it has been proposed to use, instead of a stimulable phosphor panel, (1) a radiation detector employing an amorphous selenium (a-Se) film for directly converting radiation applied to the radiation image recording medium into an electric signal to be read, or (2) an indirect conversion type radiation detector for converting radiation applied to the radiation image recording medium into visible light with a phosphor, and then converting the visible light into an electric signal with a photoelectric transducer such as a CCD (Charge-Coupled Device), a semiconductor sensor or the like employing amorphous silicon. (See, for example, Japanese Laid-Open Patent Publication No. 2001-242255, Japanese Laid-Open Patent Publication No. 2001-305224, Japanese Laid-Open Patent Publication No. 2002-82172, and Japanese Laid-Open Patent Publication No. 2002-214729.)

The above publications have proposed a portable electronic cassette including a planar radiation detector therein, which comprises a two-dimensional matrix of TFTs (thin-film transistors) or photoelectric transducers. The portable electronic cassette generates image data (subject data) by reading radiation image information from the radiation detector.

Such an electronic cassette is capable of capturing an image of a given area of the subject while being disposed in a desired direction with respect to the subject. The direction in which the radiation image information is read, i.e., the sequence in which electric charges stored in the TFTs or the photoelectric transducers are output as an image signal to a reading means, is preset. Therefore, depending on the direction of the electronic cassette with respect to the subject at the time the subject is imaged, an image of the subject data, which is to be displayed on a display device in a normal orientation, i.e., with an upper portion of the subject appearing at an upper portion of the display device screen and a lower portion of the subject appearing at a lower portion of the display device screen, may be displayed in a vertically inverted orientation or a horizontal orientation. In other words, the image of the subject data may not be displayed in a desired orientation on the display device screen.

Japanese Laid-Open Patent Publication No. 2003-14848 discloses a radiation imaging apparatus for detecting a tilt of an electronic cassette, with a tilt detecting means which is disposed in the electronic cassette, and automatically adjusting the direction of an image displayed on the screen of a display apparatus based on the detected tilt. Japanese Laid-Open Patent Publication No. 2000-197623 discloses a radiation image capturing apparatus for orienting radiation image information based on the angular displacement of an electronic cassette, which is detected by an attitude detecting means disposed in the electronic cassette. According to Japanese Laid-Open Patent Publication No. 2001-243448 and Japanese Laid-Open Patent Publication No. 2004-73586, it has been proposed to determine upper and lower ends of a subject within the radiation image information, based on the shape of the background within the radiation image information exclusive of the subject, or based on the width of the subject between contour lines thereof.

Although the radiation imaging apparatus disclosed in Japanese Laid-Open Patent Publication No. 2003-14848 can properly detect whether the electronic cassette has been placed vertically or laterally with respect to the subject, it cannot detect the direction of the electronic cassette with respect to the subject when the electronic cassette is placed horizontally with respect to the subject. The radiation image capturing apparatus disclosed in Japanese Laid-Open Patent Publication No. 2000-197623 also fails to properly orient the radiation image information when the electronic cassette is placed at an attitude other than horizontal or vertical. According to the proposals shown in Japanese Laid-Open Patent Publication No. 2001-243448 and Japanese Laid-Open Patent Publication No. 2004-73586, the position of the subject's body within the radiation image information cannot properly be determined if the radiation image information contains only an image of the subject and does not contain any background therein, and also if the subject has a complex shape or the image of the subject has a complex attitude.

Consequently, the technologies disclosed in Japanese Laid-Open Patent Publication No. 2003-14848, Japanese Laid-Open Patent Publication No. 2000-197623, Japanese Laid-Open Patent Publication No. 2001-243448, and Japanese Laid-Open Patent Publication No. 2004-73586 all fail to display the image of the subject in a desired direction on the display device screen, when the electronic cassette is oriented in certain directions with respect to the subject being imaged.

SUMMARY OF THE INVENTION

It is an object of the present invention to provide an apparatus and method for capturing a radiation image of a subject, which allows the radiation image to be displayed in any desired direction on a display device screen, even if the radiation image is captured and recorded within radiation image information, which is oriented in any direction with respect to the subject.

To achieve the above object, there is provided in accordance with the present invention an apparatus for capturing a radiation image of a subject by applying radiation emitted from a radiation source through the subject to a radiation image recording medium, comprising image reading means for reading a radiation image recorded on the radiation image recording medium and generating subject data from the read radiation image, direction detecting means for detecting a direction of the radiation image recording medium with respect to the subject, imaging direction determining means for determining the direction of the radiation image recording medium with respect to the subject during imaging of the subject, based on the detected direction, and generating imaging direction information representing the determined direction, image direction judging means for judging a direction of subject data with respect to a reading direction in which the radiation image is read by the image reading means, and generating image direction information representing the judged direction, displaying direction determining means for determining a displaying direction of the subject data based on the imaging direction information and the image direction information, and generating displaying direction information representing the determined displaying direction, and display means for displaying the subject data in the displaying direction based on the displaying direction information.

According to the present invention, there is also provided a method of capturing a radiation image of a subject by applying radiation emitted from a radiation source through the subject to a radiation image recording medium, comprising a first step of reading a radiation image recorded on the radiation image recording medium and generating subject data from the read radiation image, a second step of detecting a direction of the radiation image recording medium with respect to the subject, a third step of determining the direction of the radiation image recording medium with respect to the subject during imaging of the subject, based on the detected direction, and generating imaging direction information representing the determined direction, a fourth step of judging a direction of subject data with respect to a reading direction in which the radiation image is read, and generating image direction information representing the judged direction, a fifth step of determining a displaying direction of the subject data based on the imaging direction information and the image direction information, and generating displaying direction information representing the determined displaying direction, and a sixth step of displaying the subject data in the displaying direction based on the displaying direction information.

According to the present invention, the displaying direction information, which represents the direction at which the subject data is displayed on the screen of the display means, is generated based on two items of directional information, i.e., imaging direction information representing the direction of the radiation image recording medium with respect to the subject being imaged, and image direction information which represents the direction of the subject data with respect to the reading direction. Therefore, regardless of the direction at which the radiation image recording medium is oriented with respect to the subject during imaging of the subject, the display means can display the image data at a desired direction based on the displaying direction information. Since the displaying direction can be determined without the need for any image processing of the image data, the time required, from the time that the radiation image of the subject is captured until the subject data is displayed on the display means, can greatly be reduced.

Preferably, the apparatus further comprises a subject pattern information storage means for storing a plurality of subject pattern information representing the subject data disposed in predetermined directions with respect to the reading direction, wherein the image direction judging means determines the direction of the subject data based on the imaging direction information, and generates the image direction information representing the determined direction, or reads one of the subject pattern information which matches the direction of the subject data from the subject pattern information storage means, compares the read subject pattern information with the subject data in order to determine the direction of the subject data, and generates the image direction information representing the determined direction.

Since the image direction judging means generates image direction information based on the imaging direction information or based on the subject pattern information, the image direction judging means can accurately determine the orientation of the subject data, and hence, the subject data can be displayed accurately on the display means.

Preferably, the apparatus further comprises an imaging information storage means for storing imaging information representing a condition for imaging the subject, wherein the image direction judging means reads the imaging information depending on the subject data from the imaging information storage means, reads one of the subject pattern information depending on the read imaging information from the subject pattern information storage means, compares the read subject pattern information with the subject data in order to determine the direction of the subject data, and generates the image direction information representing the determined direction.

The image direction judging means reads optimum imaging information depending on the subject data, then reads the subject pattern information depending on the imaging information, and thereafter generates image direction information. Consequently, the image data can be displayed reliably in a desired orientation on the screen of the display means.

If the subject data includes moving image data comprising a plurality of frames or still image data comprising a plurality of successively captured frames, the image direction judging means preferably determines the direction of the subject data in a first frame of the moving image data or the still image data, and generates the image direction information representing the determined direction.

The image direction judging unit means generates the image direction information with respect to the first frame only. Accordingly, whether the image data is moving image data or still image data, the image data can be displayed quickly on the display means.

If the displaying direction determining means determines that the direction of the subject data with respect to the reading direction and the direction of the radiation image recording medium with respect to the subject are opposite to each other, based on the imaging direction information and the image direction information, the displaying direction determining means preferably determines to invert the subject data, and generates the displaying direction information representing a determined inversion of the subject data.

Specifically, if the direction of the subject data with respect to the reading direction is opposite to the direction of the radiation image recording medium with respect to the subject, then the subject data could possibly be displayed in a vertically inverted manner. However, as described above, since the subject data are inverted 180° in advance based on the displaying direction information, the subject data can be displayed easily at a desired orientation on the screen of the display means. Since the subject data is inverted in advance based on the displaying direction information, the subject data need only be scaled and rotated 90° when the subject data is displayed on the display means. Accordingly, image processing for displaying the subject data is simplified, and the burden on the system, including the display means thereof, is reduced.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3A is a schematic side elevational view showing an electronic cassette, which is disposed in a vertical orientation with respect to an upstanding subject;

FIG. 3B is a schematic side elevational view showing an electronic cassette, which is disposed in an orientation that is vertically inverted from the orientation shown in FIG. 3A with respect to the upstanding subject;

FIG. 4A is a schematic side elevational view showing an electronic cassette, which is disposed in a horizontal orientation with respect to a recumbent subject;

FIG. 4B is a schematic side elevational view showing an electronic cassette, which is disposed in an orientation that is horizontally inverted from the orientation shown in FIG. 4A with respect to the recumbent subject;

DESCRIPTION OF THE PREFERRED EMBODIMENTS

Figure 1:
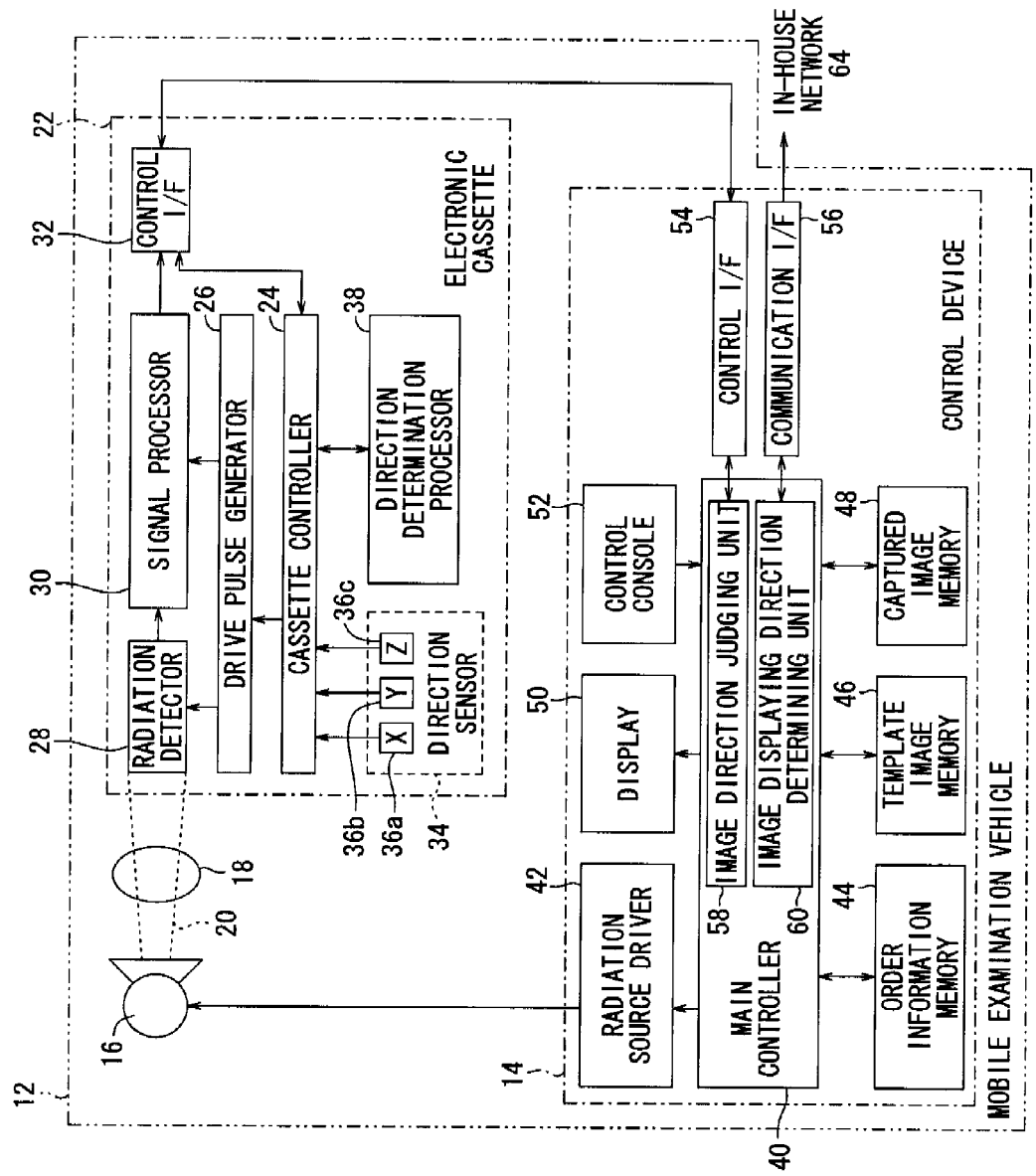
FIG. 1 is a block diagram of a radiation image capturing apparatus according to an embodiment of the present invention.

As shown in FIG. 1, a radiation image capturing apparatus 10 according to an embodiment of the present invention is installed on a mobile examination vehicle 12, which can be moved within a medical institution 62 (see FIG. 2), such as a hospital or the like. The radiation image capturing apparatus 10 generally comprises a control device 14, a radiation source 16, and an electronic cassette 22.

The radiation source 16 applies radiation X, such as X-rays or the like, through a subject 18 to the electronic cassette 22. The subject 18 may be an examinee at the medical institution 62.

The electronic cassette 22 comprises a cassette controller 24, a drive pulse generator 26, a radiation detector (radiation image recording medium) 28, a signal processor (image reading means) 30, a control interface (control I/F) 32, a directional sensor (direction detecting means) 34, and a direction determination processor 38.

As shown in FIGS. 3A through 4B, the electronic cassette 22 comprises a portable cassette, which can be disposed in any of various desired directions with respect to the subject 18, by an operator such as a doctor or a radiological technician who operates the mobile examination vehicle 12.

FIGS. 3A and 3B show the electronic cassette 22 being disposed vertically on one side of the subject 18, who is positioned in a vertical attitude or posture. The electronic cassette 22 shown in FIG. 3A, as well as the electronic cassette 22 shown in FIG. 3B, have directional sensors 34 thereof positioned in a vertically inverted relationship with respect to each other. Therefore, the vertical orientation of the electronic cassette 22 shown in FIG. 3B is inverted from the vertical orientation of the electronic cassette 22 shown in FIG. 3A.

FIGS. 4A and 4B show the electronic cassette 22 disposed horizontally between an upper plate 82 of a bed 80 and the patient 18, who is lying on the upper plate 82. The electronic cassette 22 shown in FIG. 4A and the electronic cassette 22 shown in FIG. 4B have the direction sensors 34 thereof positioned in a vertically inverted relationship with respect to each other. Therefore, the electronic cassette 22 shown in FIG. 4B has a horizontal orientation, which is inverted horizontally from the horizontal orientation of the electronic cassette 22 shown in FIG. 4A.

The radiation detector 28 shown in FIG. 1 comprises either a direct-conversion-type radiation conversion panel, comprising an integral laminated assembly made up of an amorphous selenium (a-Se) film and a two-dimensional matrix of TFTs (thin-film transistors), or an indirect-conversion-type radiation conversion panel, comprising an integral laminated assembly made up of a phosphor film and a two-dimensional matrix of photoelectric transducers and TFTs.

The drive pulse generator 26 outputs drive pulses, serving as a reading signal, in a predetermined sequence to the TFTs of the radiation detector 28, while also outputting a timing signal to the signal processor 30.

If the radiation detector 28 is a direct-conversion-type, then the amorphous selenium film directly converts the radiation 20 into an electric signal. The electric signal is stored as electric charges in the respective TFTs. The stored electric charges are then successively output as an image signal, representing the radiation image of the subject 18, to the signal processor 30 based on drive pulses that are applied to the TFTs. If the radiation detector 28 is an indirect-conversion-type, then the phosphor film converts the radiation 20 into visible light, which is converted into an electric signal by photoelectric transducers. The electric signal is stored as electric charges in the photoelectric transducers, respectively. The stored electric charges are then successively output as an image signal, representing the radiation image of the subject 18, to the signal processor 30 based on drive pulses that are applied to the TFTs.

The signal processor 30 comprises an amplifier, a sample-and-hold circuit, and an A/D converter, not shown. Based on the timing signal applied to the signal processor 30, the amplifier amplifies the image signal supplied from the radiation detector 28, and then the sample-and-hold circuit samples the amplified image signal. Then, the A/D converter converts the image signal from an analog signal into a digital signal, in order to generate image data (subject data) of the radiation image detected by the radiation detector 28, which includes an image of the subject 18. The signal processor 30 outputs the image data through the control interface I/F 32 to the control device 14.

Based on a control signal from the control device 14, the cassette controller 24 controls the drive pulse generator 26, so as to output the drive pulses to the radiation detector 28, and also to output a timing signal to the signal processor 30.

The direction sensor 34 is a three-axis positional sensor comprising X-, Y-, and Z-axis positional detectors 36a, 36b, 36c. The direction sensor 34 outputs three-dimensional positional information, which is indicative of positions of the electronic cassette 22 in respective X-, Y-, and Z-axis directions, depending on the attitude (direction) of the electronic cassette 2, which includes the radiation detector 28, through the cassette controller 24 to the direction determination processor 38.

Based on the supplied three-dimensional positional information, the direction determination processor 38 determines a direction in which the electronic cassette 22 is disposed with respect to the subject 18 being imaged, and outputs the determined direction as imaging direction information through the control interface I/F 32 to the control device 14. Specifically, the direction determination processor 38 compares information indicative of the direction of the subject 18 being imaged, e.g., the vertical direction shown in FIGS. 3A and 3B, the lateral direction, or the horizontal direction shown in FIGS. 4A and 4B, with three-dimensional positional information, in order to determine the direction at which the electronic cassette 22 is disposed with respect to the subject 18, e.g., the vertical direction shown in FIGS. 3A and 3B, the lateral direction, or the horizontal direction shown in FIGS. 4A and 4B, and outputs the determined direction as image direction information.

The vertical or lateral direction referred to above imply a vertical or horizontal direction, at which the longitudinal axis of the electronic cassette 22 is oriented while the electronic cassette 22 is disposed in an upstanding attitude (see FIGS. 3A and 3B). The direction determination processor 38 also determines whether the electronic cassette 22 is oriented upwardly or downwardly, when the electronic cassette 22 is disposed in a vertical or lateral direction. Upward or downward orientation of the electronic cassette 22 must be determined because, when the radiation image is captured, the operator might possibly place the electronic cassette 22 in an inverted direction, as shown in FIG. 3B, by mistake at a time when the operator should have placed the electronic cassette 22 in the direction shown in FIG. 3A.

The control device 14 comprises a main controller 40, a radiation source driver 42, an order information memory (imaging information storage means) 44, a template image memory (subject pattern information storage means) 46, a captured image memory 48, a display (display means) 50, a control console 52, a control interface I/F 54, and a communication interface (communication I/F) 56.

The radiation source driver 42 energizes the radiation source 16 to apply radiation 20 from the radiation source 16 through the subject 18 to the electronic cassette 22.

The order information memory 44 stores imaging order information (imaging information) concerning imaging of the subject 18, which includes information about the subject 18, e.g., gender, age, etc., of the subject 18, the direction at which the electronic cassette 22 is oriented with respect to the subject 18 when the radiation image of the subject 18 is captured, and an imaging method for the subject 18, e.g., a single image, a succession of images, or a moving image.

The template image memory 46 stores a plurality of templates (subject pattern information) representing image data oriented in given directions with respect to the reading direction at which the radiation image is read, i.e., the sequence in which the image signal is output from the photoelectric transducer. Such templates represent classified image data of radiation images of examinees (shape patterns of subject data), which are imaged according to each imaging method for the subject 18. The template image memory 46 stores shape patterns indicative of body structure contours, including bones, organs, etc., as templates.

The captured image memory 48 stores image data of each examinee, i.e., the subject 18, such data being supplied from the electronic cassette 22 through the control interface I/F 54 to the main controller 40. The display 50 serves to display the image data supplied to the main controller 40 on the screen thereof. The control console 52 comprises a terminal, such as a keyboard or the like, which can be operated by the operator.

Based on an input action made on the control console 52 by the operator, the main controller 40 controls the radiation source driver 42 to apply radiation 20 from the radiation source 16, controls the cassette controller 24 of the electronic cassette 22 through the control interface I/F 54 to output the image data based on the radiation image, controls the display 50 to display the image data supplied from the electronic cassette 22 through the control interface I/F 54 on the screen thereof, and controls the captured image memory 48 to store the image data.

The main controller 40 includes an image direction judging unit (image direction judging means) 58 and an image displaying direction determining unit (displaying direction determining means) 60.

The image direction judging unit 58 judges the direction of the image data with respect to the direction at which the signal processor 30 reads the radiation image, and generates image direction information representing the judged direction.

Specifically, if the electronic cassette 22 is disposed in a vertical direction or in a lateral direction, then the image direction judging unit 58 judges the direction of the image data based on the imaging direction information supplied from the direction determination processor 38, through the cassette controller 24 and the control interfaces I/Fs 32 and 54, and generates image direction information representing the judged direction.

If the electronic cassette 22 is disposed in a horizontal direction, then the image direction judging unit 58 reads imaging order information depending on the image data from the order information memory 44, reads a template depending on the read imaging order information from the template image memory 46, compares the read template and the image data with each other in order to determine the direction of the image data, and generates image direction information representing the determined direction.

If the image data is represented by moving image data comprising a plurality of frames, or still image data comprising a plurality of successively captured frames, then the image direction judging unit 58 judges the direction of the image data in the first frame of the moving image data or the still image data, and generates image direction information representing the judged direction. The image data includes image data, which is successively captured in phase with respiratory cycles, such as image data indicative of respiratory motion of the chest.

The image displaying direction determining unit 60 determines a displaying direction of the image data, which is to be displayed on the screen of the display 50 or on a display device 68 (see FIG. 2) based on the imaging direction information and the image direction information, and generates displaying direction information representing the determined direction.

For example, if the image displaying direction determining unit 60 judges, based on the imaging direction information and the image direction information, that the direction of the image data with respect to the reading direction referred to above and the direction of the electronic cassette 22 with respect to the subject 18 are opposite to each other, then the image displaying direction determining unit 60 determines that the image data is inverted, and generates displaying direction information representing the determined inversion of the image data.

The main controller 40 performs either one of the processes (1) through (3) (shown below) on the image data, based on the displaying direction information supplied from the image displaying direction determining unit 60.

(1) The main controller 40 rotates the image data based on the displaying direction information, displays the rotated image data on the display 50 or on the display device 68, and stores the displayed image data in the captured image memory 48.

(2) The main controller 40 adds displaying direction information to the image data supplied from the electronic cassette 22, and stores the displaying direction information and the image data together in the captured image memory 48. For displaying the image data on the display 50 or on the display device 68, the main controller 40 reads the image data and the displaying direction information from the captured image memory 48, and then rotates the image data based on the displaying direction information. Then, the main controller 40 displays the rotated image data on the display 50 or on the display device 68.

(3) If the image displaying direction determining unit 60 judges that the image data is vertically inverted image data based on the imaging direction information and the image direction information, then the image displaying direction determining unit 60 vertically inverts the image data in advance by 180°, generates displaying direction information indicating that the inverted image data needs to be rotated through 90°, for example, and stores the displaying direction information and the inverted image data in the captured image memory 48. After the main controller 40 reads the inverted image data and the displaying direction information from the captured image memory 48, the main controller 40 rotates the inverted image data by 90° based on the displaying direction information, scales the image data as necessary, and thereafter displays the rotated image data on the display 50 or on the display device 68.

Figure 2:
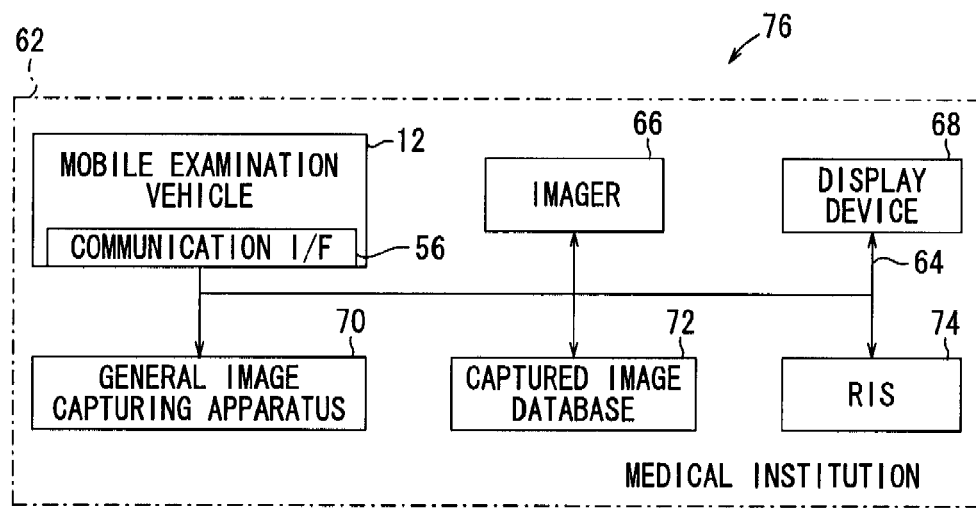
FIG. 2 is a block diagram of a medical support system.

FIG. 2 shows in block form a medical support system 76 constructed in the vicinity of a radiological department of the medical institution 62.

The medical support system 76 comprises the mobile examination vehicle 12, an imager 66, the display device 68, a general image capturing apparatus 70, a captured image database 72, and a radiation information system (RIS) 74 located in the radiological department, which are connected to each other by an in-house network 64.

The image data and the displaying direction information, which are stored in the captured image memory 48 (see FIG. 1) on the mobile examination vehicle 12, are output through the communication interface I/F 56 and the in-house network 64 to the RIS 74, which in turn manages the image data, the displaying direction information, and other information. The image data and the displaying direction information are also stored in the captured image database 72.

Based on the image data and the displaying direction information that are stored in the captured image database 72, or based on the image data and the displaying direction information that are supplied from the captured image memory 48 through the communication interface I/F 56 and the in-house network 64, the RIS 74 displays the image data on the screen of the display device 68, and prints the image data on the imager 66. The captured image database 72 also stores radiation image information that has been captured by the general image capturing apparatus 70, which is a general radiation image capturing apparatus installed in the medical institution 62. The RIS 74 can manage radiation image information supplied from the general image capturing apparatus 70, as well as image data and displaying direction information supplied from the mobile examination vehicle 12.

The radiation image capturing apparatus 10 according to the present embodiment is basically constructed as described above. Operations of the radiation image capturing apparatus 10 shall be described below with reference to the flowcharts shown in FIGS. 5 and 6.

Figure 5:
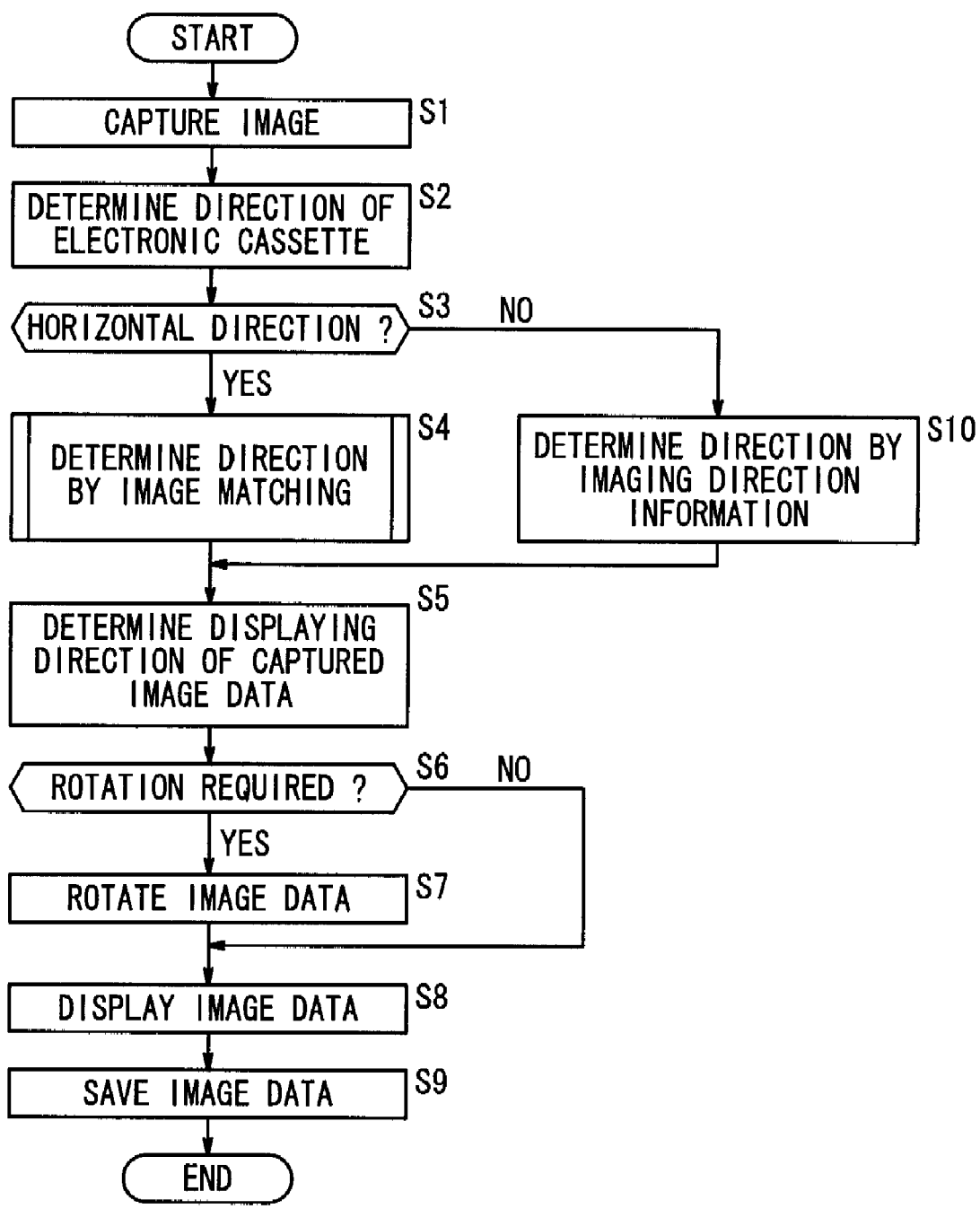
FIG. 5 is a flowchart of an operation sequence of the radiation image capturing apparatus shown in FIG. 1.
Figure 6:
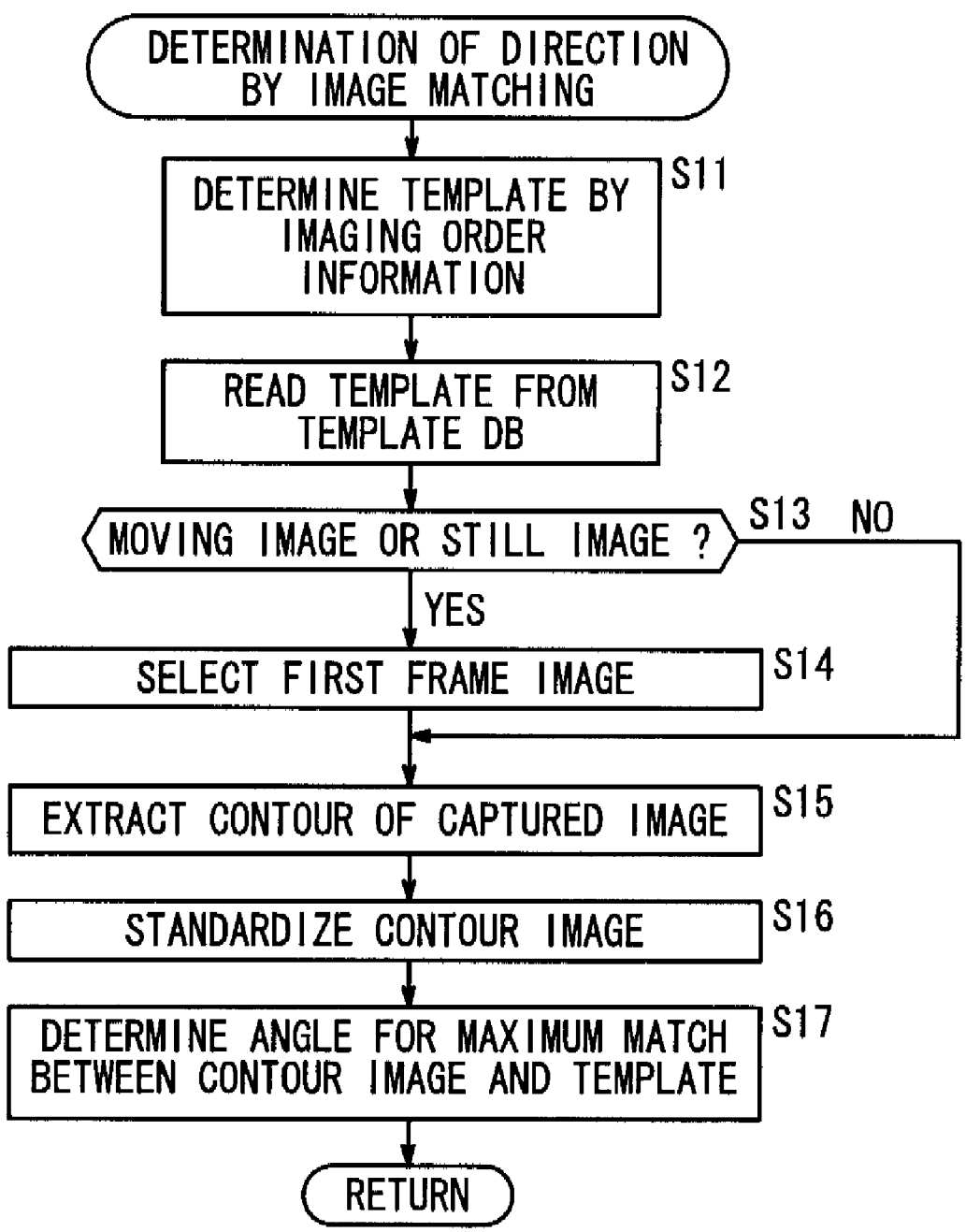
FIG. 6 is a flowchart illustrating specific processing details of step S4 of the operation sequence shown in FIG. 5.

FIG. 5 is a flowchart indicating an operation sequence of the radiation image capturing apparatus 10, from a time when a radiation image of the subject 18 is captured until the image data of the radiation image area is stored in the captured image memory 48. FIG. 6 is a flowchart indicating specific processing details of the image direction judging unit 58, for determining the direction of the image data.

In step S1 (first step), while the subject 18 is disposed between the radiation source 16 (see FIG. 1) and the electronic cassette 22, the main controller 40 controls the radiation source driver 42 to enable the radiation source 16 to begin applying radiation 20 to the electronic cassette 22. The main controller 40 also controls the cassette controller 24 of the electronic cassette 22 to output image data to the control device 14 based on the radiation image of the subject 18, and based on an input action at the control console 52 made by the operator.

The radiation source 16 applies radiation 20 through the subject 18 to the electronic cassette 22 based on a control signal from the radiation source driver 42. As a result, the radiation detector 28 is irradiated with radiation 20, and accumulates electric charges in the TFTs (assuming the radiation detector 28 is a direct conversion type), or in photoelectric transducers (assuming the radiation detector 28 is an indirect conversion type).

Based on a control signal from the main controller 40, the cassette controller 24 of the electronic cassette 22 controls the drive pulse generator 26 in order to output drive pulses together with a timing signal. The drive pulse generator 26 outputs the drive pulses in a predetermined sequence to the radiation detector 28, and outputs the timing signal to the signal processor 30. Based on the supplied drive pulses, the TFTs in the radiation detector 28 successively output the accumulated electric charges as an image signal, representing the radiation image of the subject 18, to the signal processor 30. Based on the supplied timing signal, the amplifier of the signal processor 30 amplifies the image signal supplied from the radiation detector 28. The sample-and-hold circuit thereof samples the image signal, and the A/D converter thereof converts the image signal from an analog signal into a digital signal, thereby generating image data representing the radiation image. The signal processor 30 outputs the image data through the control interface I/F 32 to the control device 14.

At this time, the positional detectors 36*a*, 36*b*, 36*c* of the direction sensor 34 output three-dimensional positional information of the electronic cassette 22 through the cassette controller 24 to the direction determination processor 38 (second step).

In step S2 (third step), the direction determination processor 38 determines the direction of the electronic cassette 22 with respect to the subject 18 being imaged (e.g., the vertical direction shown in FIGS. 3A and 3B, the lateral direction, or the horizontal direction shown in FIGS. 4A and 4B), based on information concerning the direction of the subject 18 being imaged and the three-dimensional positional information, and outputs the determined direction as imaging direction information through the control interface I/F 32 to the control device 14. If the direction determination processor 38 judges that the electronic cassette 22 is disposed vertically or laterally with respect to the subject 18, then the direction determination processor 38 also determines whether the electronic cassette 22 is oriented upwardly or downwardly (see FIGS. 3A and 3B).

Then, the image direction judging unit 58 judges in step S3 whether the imaging direction information supplied from the electronic cassette 22 through the control interface I/F 54 represents a horizontal direction or not.

If the imaging direction information represents a horizontal direction (YES in step S3), then, in step S4 (fourth step), the image direction judging unit 58 performs a process for determining the direction of the image data, i.e., a process for generating image direction information, based on the imaging order information stored in the order information memory 44, and based on templates stored in the template image memory 46.

Then, in step S5 (fifth step), the image displaying direction determining unit 60 determines a displaying direction of the image data that is to be displayed on the screen of the display 50 or the display device 68, based on the imaging direction information and the image direction information, and generates displaying direction information, which represents the determined direction.

Then, in step S6, the main controller 40 determines whether the displaying direction information indicates that the image data is rotated or not. If the displaying direction information indicates rotation of the image data (YES in step S6), then the main controller 40 rotates the image data through a given angle (e.g., 180°) in step S7, and displays the rotated image data on the screen of the display 50 or the display device 68 in step S8 (sixth step). In step S9, image data displayed on the screen of the display 50 or the display device 68 is stored in the captured image memory 48.

If the imaging direction information represents a vertical direction or a lateral direction (NO in step S3), then the image direction judging unit 58 determines the direction of the image data based on the imaging direction information, and generates image direction information representing the determined direction in step S10 (fourth step).

If the displaying direction information does not indicate rotation of the image data (NO in step S6), then the control sequence skips over step S7, and the main controller 40 displays the image data in an unrotated state on the screen of the display 50 or the display device 68. Thereafter, in step S9, the image data and the displaying direction information are stored in the captured image memory 48.

Specific processing details of step S4 shall be described below with reference to FIG. 6.

In step S11, the image direction judging unit 58 (see FIG. 1) reads imaging order information depending on the image data from the order information memory 44. Then, in step S12, the image direction judging unit 58 determines a template depending on the read imaging order information, and reads the determined template from the template image memory 46.

Then, in step S13, the image direction judging unit 58 determines whether or not the image data are moving image data comprising a plurality of frames or still image data comprising a plurality of successively captured frames. If the image data are judged to be moving image data or still image data (YES in step S13), then, in step S15, the image direction judging unit 58 selects a first frame of the moving image data or the still image data in step S14, and extracts a contour (hereinafter also referred to as a "contour image") of the subject 18 within the first frame, according to an image processing method such as an edge detecting process.

Figure 7:
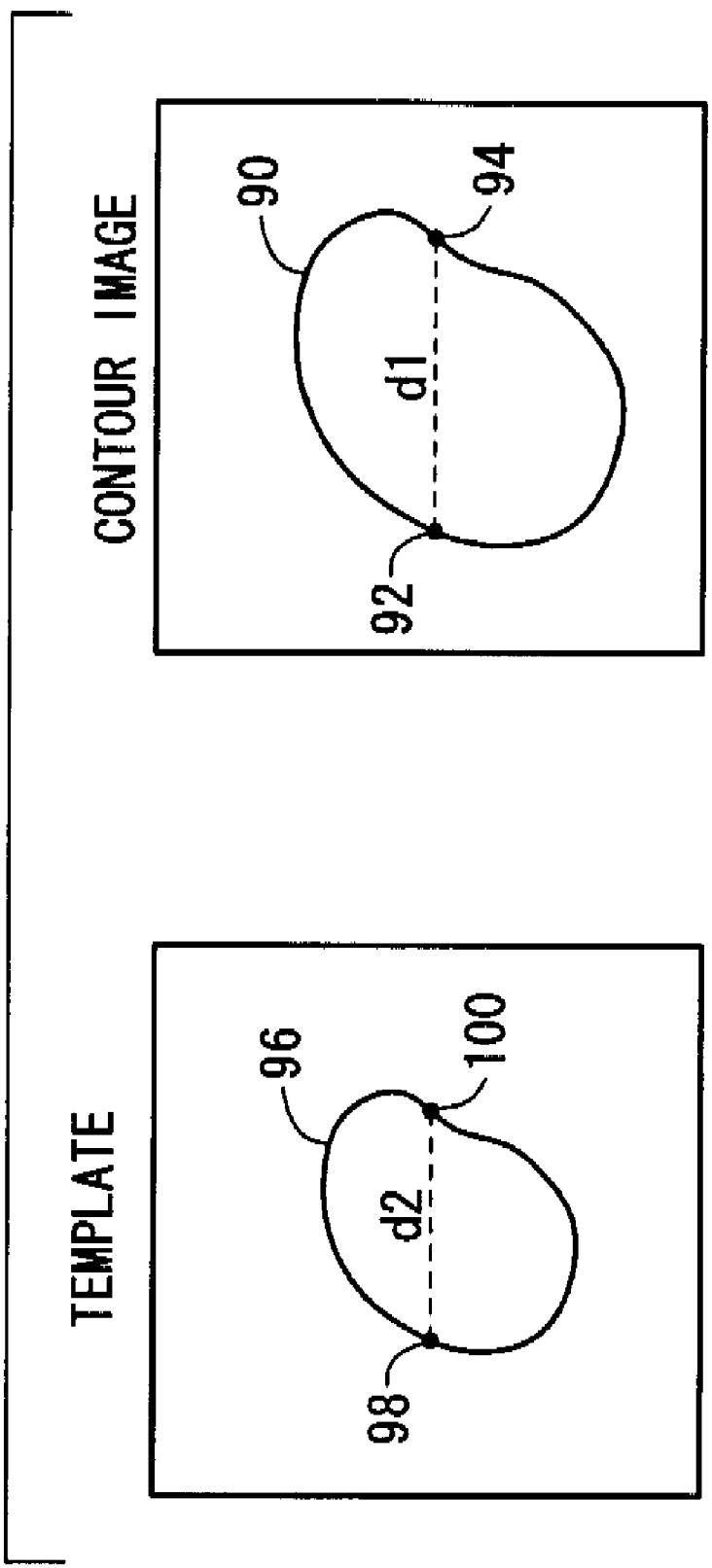
FIG. 7 is a diagram illustrating a process used in standardizing a contour image, in step S16 of the operation sequence shown in FIG. 6.

In step S16, as shown in FIG. 7, the image direction judging unit 58 extracts two points in the contour image, denoted by 90, as feature points 92, 94. The image direction judging unit 58 then compares a distance d1 between the two feature points 92, 94 in the contour image 90 with a distance d2 between two feature points 98, 100 in the template, denoted by 96, which correspond to the feature points 92, 94, whereupon the image direction judging unit 58 scales, i.e., enlarges or reduces, the contour image 90 so as to equalize the distance d1 to the distance d2, thereby standardizing the contour image 90.

In step S17 shown in FIG. 6, while the image direction judging unit 58 rotates the template 96, the image direction judging unit 58 searches for an angle at which the rotated template 96 and the contour image 90 become matched maximally to each other, i.e., an angle at which the matching ratio between the rotated template 96 and the contour image 90 is maximum. The image direction judging unit 58 uses this angle as image direction information, which represents the direction of the image data.

If the image data are not made up of moving image data or still image data (NO in step S13), then the control sequence skips over step S14, and goes directly to step S15.

According to the present embodiment, the displaying direction information, which represents the direction at which the image data is displayed on the screen of the display 50 or the display device 68, is generated based on two items of directional information, i.e., imaging direction information representing the direction of the electronic cassette 22 with respect to the subject 18 and image direction information representing the direction of the image data with respect to the reading direction of the radiation detector 28, i.e., the photoelectric transducers. Therefore, regardless of the direction at which the electronic cassette 22 is oriented with respect to the subject 18 during imaging of the subject 18, the display 50 or the display device 68 can display such image data in a desired direction, based on the displaying direction information. Since the displaying direction can be determined, i.e., displaying direction information can be generated, without the need for performing image processing on the image data, the time required from when the radiation image of the subject 18 is captured until the image data is displayed on the display 50 or on the display device 68 can be greatly reduced.

The image direction judging unit 58 determines the direction of the image data based on the imaging direction information and generates image direction information representing the determined direction, or reads imaging order information from the order information memory 44 based on the imaging direction information, reads a template from the template image memory 46 based on the imaging order information, and generates image direction information based on the read template.

Since the image direction judging unit 58 generates the image direction information based on the imaging direction information, or based on the imaging direction information, the imaging order direction and the template, the image direction judging unit 58 can accurately determine the direction of the image data, and hence the image data can be accurately displayed on the display 50 or on the display device 68. Under any of various image capturing conditions, the image direction judging unit 58 reads optimum imaging order information depending on the image data, reads a template depending on the imaging order information, and generates the image direction information. Consequently, the image data can be displayed reliably in any desired direction on the screen of the display 50 or the display device 68.

If the image data is moving image data or still image data, then the image direction judging unit 58 generates image direction information with respect to only the first frame thereof. Accordingly, the image data, whether moving image data or still image data, can quickly be displayed on the display 50 or on the display device 68.

If the direction of the image data with respect to the reading direction and the direction of the electronic cassette 22 with respect to the subject 18 are opposite to each other, then the image data could potentially be displayed in a vertically inverse form on the screen of the display 50 or on the display device 68. However, the image data can be displayed easily in a desired direction on the screen, as a result of inverting the image data in advance based on the displaying direction information.

Figure 8A:
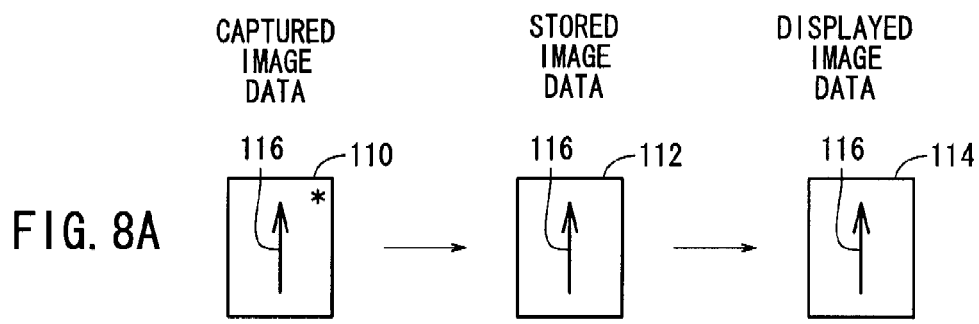
FIGS. 8A through 8D are diagrams showing the relationship between captured image data, image data stored in a captured image memory, and image data displayed on a display or on a display device.
Figure 8B:
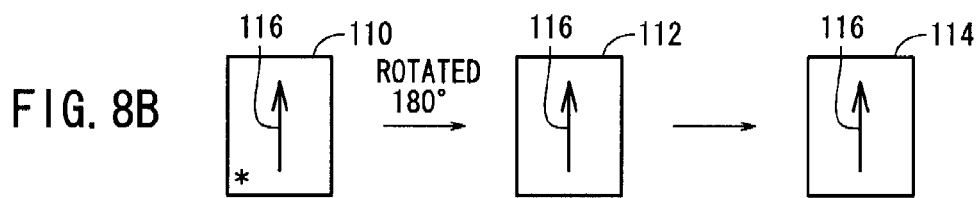

FIGS. 8A through 8D illustrate the above advantages, while showing the relationship between the captured image data 110, the image data 112 stored in the captured image memory 48, and the image data 114 displayed on the screen of the display 50 or on the display device 68. In FIGS. 8A and 8B, the electronic cassette 22 is oriented vertically, while in FIGS. 8C and 8D, the electronic cassette 22 is oriented laterally. In FIGS. 8A through 8D, the image data 112 is stored vertically. In FIGS. 8A through 8D, the image data 110 starts being read from a readout start position, indicated by the asterisk *, along a shorter side of the image data 110. The arrows appearing in the image data 110, 112 and 114 represent the direction 116 of the image data (image data direction).

In FIG. 8A, the imaging direction, i.e., the image data direction 116 of the image data 110, and the readout start position agree with each other. Thus, the image data directions 116 in the image data 110, 112, 114 are the same as each other.

In FIG. 8B, the imaging direction and the readout start position are vertically inverted in relation to each other. Thus, in this case, the image data 110 is vertically inverted and stored as image data 112 in the captured image memory 48, and then, the image data 112 is displayed as image data 114 on the screen of the display 50, or on the display device 68.

Figure 8C:
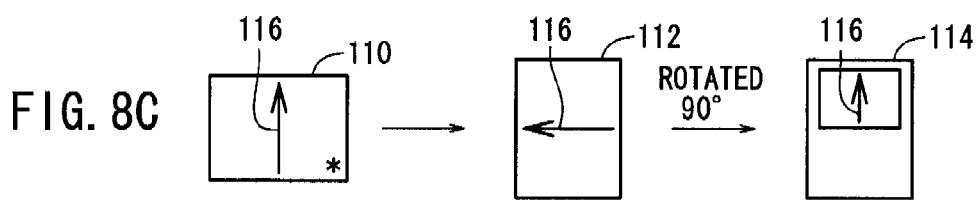

In FIG. 8C, the imaging direction and the readout start position are in agreement with each other. In this case, the image data 112 stored in the captured image memory 48 is rotated by 90° to produce the image data 114, which is displayed on the screen of the display 50 or the display device 68.

Figure 8D:
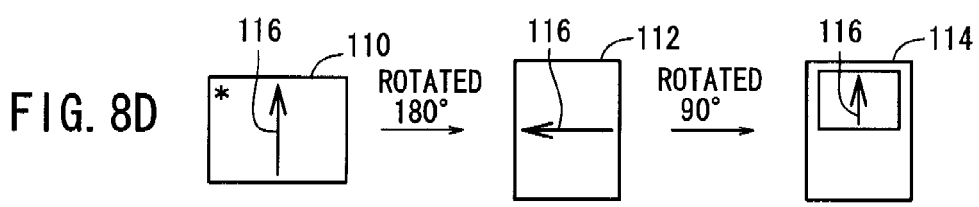

In FIG. 8D, the imaging direction and the readout start position are vertically inverted in relation to each other. In this case, the image data 110 is vertically inverted and stored as the image data 112 in the captured image memory 48. Then, the image data 112 is rotated by 90° to produce the image data 114, which is displayed on the screen of the display 50 or the display device 68.

As described above, the image data 110 of the captured image is inverted 180° in advance, and is stored as image data 112 in the captured image memory 48. For displaying the image data 114 on the display 50, or on the display device 68, based on the image data 112, the image data 112 need only be scaled and rotated 90° (see FIG. 8D). Accordingly, image processing for displaying the image data 114 is simplified, and the burden on the system, including the burden on the display 50 or the display device 68, is reduced.

In the above embodiment, the radiation detector 28 is employed as a radiation image recording medium. However, the principles of the present invention may also be applied to a radiation image capturing apparatus, which utilizes a stimulable phosphor sheet or a silver halide film as the radiation image recording medium, wherein the electronic cassette 22, including the signal processor 30 thereof as the image reading means, is modified to be compatible with a stimulable phosphor sheet or a silver halide film. Furthermore, although the signal processor 30 has been described as the image reading means in the above embodiment, the signal processor 30 and the main controller 40 in combination, or alternatively the main controller 40 alone, may operate as the image reading means.

Although a preferred embodiment of the present invention has been shown and described in detail above, it should be understood that various changes and modifications may be made thereto without departing from the scope of the invention as set forth in the appended claims.

What is claimed is:

1. An apparatus for capturing a radiation image of a subject by applying radiation emitted from a radiation source through the subject to a radiation image recording medium, comprising:

image reading means for reading a radiation image recorded on the radiation image recording medium and generating subject data from the read radiation image;

direction detecting means for detecting a direction of said radiation image recording medium with respect to said subject;

imaging direction determining means for determining the direction of said radiation image recording medium with respect to said subject during imaging of the subject, based on the detected direction, and generating imaging direction information representing the determined direction;

image direction judging means for judging a direction of subject data with respect to a reading direction in which said radiation image is read by said image reading means, and generating image direction information representing the judged direction;

displaying direction determining means for determining a displaying direction of said subject data based on said imaging direction information and said image direction information, and generating displaying direction information representing the determined displaying direction;

display means for displaying said subject data in said displaying direction based on said displaying direction information; and subject pattern information storage means for storing a plurality of subject pattern information representing the subject data disposed in predetermined directions with respect to said reading direction, wherein said image direction judging means reads one of said subject pattern information which matches the direction of the subject data from said subject pattern information storage means, compares the read subject pattern information with said subject data in order to determine the direction of said subject data, and generates the image direction information representing the determined direction, and wherein the subject pattern information represents classified image data of shape patterns of the subject data.

2. An apparatus according to claim 1, further comprising:

imaging information storage means for storing imaging information representing a condition for imaging said subject, wherein said image direction judging means reads said imaging information depending on said subject data from said imaging information storage means, reads one of said subject pattern information depending on the read imaging information from said subject pattern information storage means, compares the read subject pattern information with said subject data in order to determine the direction of said subject data, and generates the image direction information representing the determined direction.

3. An apparatus according to claim 1, wherein if said subject data includes moving image data comprising a plurality of frames or still image data comprising a plurality of successively captured frames, said image direction judging means determines the direction of the subject data in a first frame of said moving image data or said still image data, and generates the image direction information representing the determined direction.

4. An apparatus according to claim 1, wherein if said displaying direction determining means determines that the direction of said subject data with respect to said reading direction and the direction of said radiation image recording medium with respect to said subject are opposite to each other, based on said imaging direction information and said image direction information, said displaying direction determining means determines to invert said subject data, and generates the displaying direction information representing a determined inversion of the subject data.

5. An apparatus according to claim 1, for use on a mobile examination vehicle, which is movable in a medical institution.

6. An apparatus according to claim 1, further comprising:
an electronic cassette housing therein said radiation image recording medium, said image reading means, said direction detecting means, and said imaging direction determining means,
wherein said electronic cassette comprises a portable cassette which can be disposed in any direction with respect to said subject.

7. An apparatus according to claim 1, wherein said direction detecting means comprises a three-axis positional sensor for outputting three-dimensional positional information depending on an attitude of said radiation image recording medium.

8. A method of capturing a radiation image of a subject by applying radiation emitted from a radiation source through the subject to a radiation image recording medium, comprising:
a first step of reading a radiation image recorded on the radiation image recording medium and generating subject data from the read radiation image;
a second step of detecting a direction of said radiation image recording medium with respect to said subject;
a third step of determining the direction of said radiation image recording medium with respect to said subject during imaging of the subject, based on the detected direction, and generating imaging direction information representing the determined direction;
a fourth step of judging a direction of subject data with respect to a reading direction in which said radiation image is read, and generating image direction information representing the judged direction;
a fifth step of determining a displaying direction of said subject data based on said imaging direction information and said image direction information, and generating displaying direction information representing the determined displaying direction; and
a sixth step of displaying said subject data in said displaying direction based on said displaying direction information,
wherein in said fourth step, one of a plurality of subject pattern information representing the subject data disposed in predetermined directions with respect to said reading direction, said subject pattern information matching the direction of the subject data, is compared with said subject data in order to determine the direction of said subject data, and the image direction information is generated as representing the determined direction, and
wherein the subject pattern information represents classified image data of shape patterns of the subject data.

9. A method according to claim 8, wherein in said fourth step, one of the subject pattern information depending on said subject data generated in said first step and imaging information representing a condition for imaging said subject is compared with said subject data in order to determine the direction of said subject data, and the image direction information generated as representing the determined direction.

10. A method according to claim 8, wherein in said fourth step, if said subject data includes moving image data comprising a plurality of frames or still image data comprising a plurality of successively captured frames, the direction of the subject data in a first frame of said moving image data or said still image data is determined, and the image direction information is generated as representing the determined direction.

11. A method according to claim 8, wherein if said displaying direction information indicates rotation of said subject data, said sixth step is executed after said subject data are rotated through a predetermined angle.

* * * * *